United States Patent
Karp et al.

(10) Patent No.: US 7,096,196 B1
(45) Date of Patent: Aug. 22, 2006

(54) NEGOTIATION PROTOCOL WITH COMPROMISE THAT IS GUARANTEED TO TERMINATE

(75) Inventors: Alan H. Karp, Palo Alto, CA (US); Chris Preist, Montpelier (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/525,515

(22) Filed: Mar. 15, 2000

(51) Int. Cl.
*G06Q 40/00* (2006.01)

(52) U.S. Cl. .......................... 705/37; 705/35

(58) Field of Classification Search ............. 705/80, 705/35, 37; 707/104
See application file for complete search history.

(56) References Cited

U.S. PATENT DOCUMENTS

| | | | | |
|---|---|---|---|---|
| 5,905,975 A | * | 5/1999 | Ausubel | 705/37 |
| 6,112,189 A | * | 8/2000 | Rickard | 705/37 |
| 6,131,087 A | * | 10/2000 | Luke et al. | 705/26 |
| 6,260,024 B1 | * | 7/2001 | Shkedy | 705/37 |
| 6,330,551 B1 | * | 12/2001 | Burchetta | 705/80 |
| 6,401,080 B1 | * | 6/2002 | Bigus et al. | 705/37 |
| 6,442,567 B1 | * | 8/2002 | Retallick | 707/104 |
| 6,605,121 B1 | * | 8/2003 | Roderick | 715/513 |
| 2002/0013631 A1 | * | 1/2002 | Parunak et al. | 700/28 |
| 2002/0161779 A1 | * | 10/2002 | Brierley et al. | 707/103 R |

OTHER PUBLICATIONS

Rosenschein, Jeffrey S., et al., Rules of Encounter: Designing Conventions For Automated Negotiation Among Computers, pp. 40-41, 1994.
Jennings, N.R., et al., "Autonomous Agents For Business Process Management", International Journal of Applied Artificial Intelligence, 2000.
Faratin, P., et al."Designing Responsive And Deliberate Automated Negotiators", Proc. AAAI Workshop on Negotiation: Settling Conflicts And Identifying Opportunities, 1999.
Parsons, Simon, et al., "Agents That Reason And Negotiate By Arguing", Journal of Logic And Computation 8, pp. 1-33, 1998.

* cited by examiner

*Primary Examiner*—Alain L. Bashore

(57) ABSTRACT

A negotiation protocol that allows for multi-attribute in a negotiation that is guaranteed to terminate. The negotiation protocol comprises a plurality of rounds including an advertisement, look-up, offer, counter, agreement, and failure. A negotiation conducted according to the negotiating protocol follows these rounds. These rounds have rules by negotiating parties. These rules are directed towards allowing compromise and leading the negotiation towards agreement or failure. If the rules are obeyed, then every negotiation will end in either the agreement or failure round.

34 Claims, 2 Drawing Sheets

NEGOTIATION PROTOCOL WITH COMPROMISE THAT IS GUARANTEED TO TERMINATE

FIELD OF THE INVENTION

The field of the invention is electronic negotiations, and more particularly, protocols for improving the conduct of electronic negotiations.

BACKGROUND OF THE INVENTION

Electronic negotiation is of increasing importance in the digital economy. As commercial transactions over the Internet or e-commerce grows in importance and quantity, the number of electronic negotiations conducted without the direct involvement of people in the process increases. Two different fields have developed to handle these electronic negotiations: one utilizing "agent" technology and the other relying on "protocols" for conducting the negotiation. A detailed discussion of the differences between these two fields would be quite complex. However, each does have a different character. For example, an agent presumably attempts to adjust its behavior to adapt to each negotiating situation. A protocol, however, is a well-defined set of steps or rounds by which each negotiation is conducted.

A significant amount of research has been devoted towards systems utilizing agent software that can implement complex negotiations. However, none of these systems has achieved widespread acceptance. Part of the reason that these systems have not been accepted is that they must be extremely complex to support a large amount of generality. A system with agent software has not been developed which can simply and practically conduct any type of negotiation.

More common than agent systems are simple protocols. In these simple protocols, negotiating parties exchange offers and responses for a particular attribute or parameter, such as color, until agreement is reached. The parties then repeat this procedure for some other attribute, such as style. Unfortunately, these simple protocols do not allow for multiple-attribute compromise. For example, a negotiating party may be willing to accept an orange sweater only in crewneck style. Since each attribute is negotiated separately, the negotiating party cannot communicate such a compromise offer.

Some protocols overcome this problem by using a trusted third party that receives full information from each negotiating party and selects the appropriate values for the specified attributes. Inherent in this type of protocol is the requirement that each party reveal to the third party the least favorable deal that it will accept.

Another problem with using existing protocols for multi-attribute negotiation is never-ending, or non-terminating, negotiations. By not limiting negotiations to a set of attributes at the outset, the negotiating parties can repeatedly introduce new attributes. Likewise, without a set of rules that lead towards an agreement or a failed negotiation, existing protocols are not guaranteed to terminate.

SUMMARY OF THE INVENTION

The invention is a method for conducting a negotiation. Specifically, the invention is a negotiation protocol that allows for multi-attribute compromise in a negotiation that is guaranteed to terminate. The negotiation protocol comprises a plurality of rounds including an advertisement, look-up, offer, counter, agreement, and failure. A negotiation conducted according to the negotiating protocol follows these rounds. These rounds have rules which must be obeyed by negotiating parties. These rules are directed towards allowing compromise and leading the negotiation towards agreement or failure. If the rules are obeyed, then every negotiation will end in either the agreement or failure round.

The negotiation protocol allows the negotiating parties to negotiate multiple attributes simultaneously and requires the inclusion of all undecided attributes in subsequent rounds, thereby allowing multi-attribute compromise. This allows negotiating parties to keep knowledge of their least favorable acceptable conditions confidential, since third parties are unnecessary.

Termination of the negotiation is guaranteed in a finite number of rounds since the protocol requires a finite number of attributes and a reduction in the list of values of each attribute or in the numeric range of each attribute. Consequently, the negotiation protocol is simpler to implement since no special code is needed to detect infinite negotiations. Finally, the negotiation protocol allows ultimatums which lead to the shortening of the negotiation. In sum, since negotiations are guaranteed to terminate and compromise is allowed, the negotiation protocol is particularly useful for electronic negotiations conducted over the Internet.

DETAILED DESCRIPTION OF THE INVENTION

The invention is a negotiation protocol 10 that allows for compromise and is guaranteed to terminate. The negotiation protocol 10 mandates that an electronic negotiation proceeds in a finite number of rounds. Each round obeys a set of rules. The negotiation protocol 10 may be used for any negotiation, including negotiations for products or services, that obeys the negotiation protocol 10 and the rules of each round. Each negotiation may have a unique vocabulary so long as it follows the negotiation protocol 10. Below, the negotiation protocol 10 is described in detail, followed by an example of a negotiation conducted according to the negotiation protocol 10.

Figure 1:
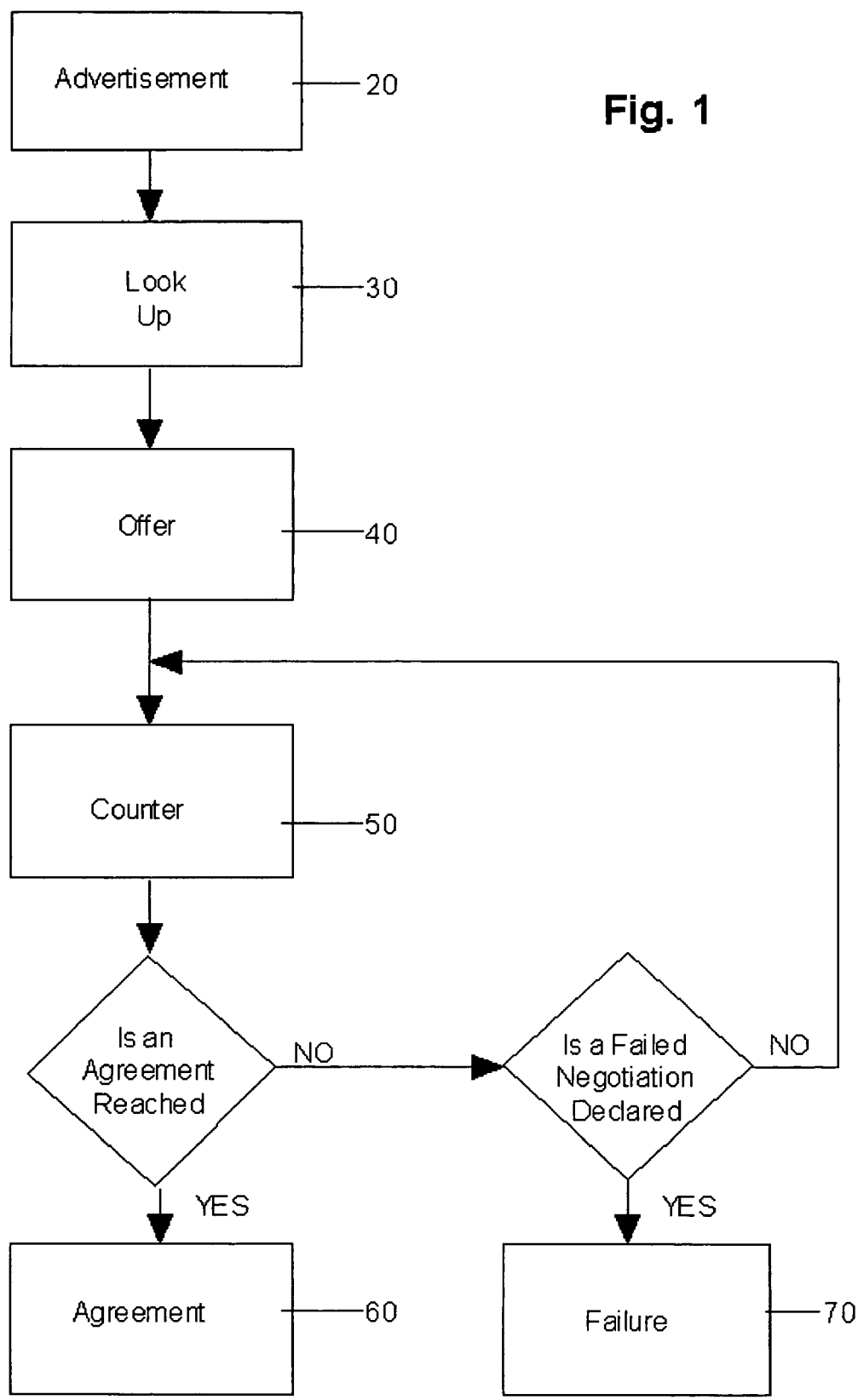
FIG. 1 is a flowchart of an embodiment of a negotiation protocol.

As shown in FIG. 1, an embodiment to the negotiation protocol 10 comprises rounds of Advertisement 20, Look-up 30, Offer 40, Counter 50, Agreement 60 and Failure 70. A negotiation conducted according to the negotiation protocol 10 will include an Advertisement 20, Look-Up 30, Offer 40, one or more Counters 50, and will end in either Agreement 60 or Failure 70. In every negotiation there are negotiating parties. The negotiating parties take turns conducting the rounds of the negotiation according to the negotiation protocol 10. At any point after the Offer 40, the negotiating parties can reach Agreement 60 or Failure 70. Failure 70 is reached when a failed negotiation is declared, by one of the negotiating parties in a Counter 50, for violation of the negotiation protocol 10 or for failure to reach Agreement 60, as described in detail below. In the negotiation described below, the negotiating parties are a vendor and a buyer. However, any parties that wish to conduct a negotiation may be the negotiating parties.

In the first round of the negotiation protocol 10, the Advertisement 20, a product(s) or service(s) is listed. In the Advertisement 20 round, the vendor is advertising the product(s) or service(s) to be negotiated. The Advertisement 20 provides a set of attribute-value pairs describing the vendor's product(s) or service(s). The Advertisement 20 may include any attribute that has a plurality of potential values. The attributes and values may be described by any vocabulary as long as the attributes and values are listed as negotiable attribute-value pairs. For example, the products might be shoes that come in three styles, pump, slipper and sandal, and three colors, red, tan, and brown. This example has a set of nine (9) attribute-value pairs which can be constructed by combining each of three styles: style=pump, style=slipper, style=sandal; with each of three colors: color=red, color=tan, and color=brown. In this example, the attributes are style and color. Many attributes may be listed in the Advertisement 20, including, but not limited to, price, payment method, quantity, or size. Once again, any type of attribute with multiple values and described by a unique vocabulary may be listed (an attribute that only has a single potential value may be listed, but it is not be negotiated). The attributes of the provided attribute-value pairs are the only attributes that may be negotiated under the negotiation protocol 10.

The values of the attribute-value pairs are normally provided as discrete values. As in the above example, style=pump, slipper, and sandal. However, for continuous attributes, such as quantity, a numeric range may be specified. For example, instead of listing quantity=50, 100, 150, the Advertisement 20 may specify that quantity=50–150, meaning that wholesale orders for at least 50 and no more than 150 units will be accepted. As seen here, often a numeric range makes more sense than discrete values.

Referring back to FIG. 1, the next round in the negotiation protocol 10, the Look-Up 30, is conducted by a buyer who is interested in buying an advertised product(s) or service(s). In the Look-Up 30, the buyer is looking-up the service(s) or product(s) that it is interested in by comparing attribute-value(s) provided by the buyer with the attribute-value pairs included in the Advertisement 20. The service(s) or products(s) are found if the attribute-value pairs in the Advertisement 20 match the attribute-value(s) of the service(s) or product(s) that the buyer is interested in. If there is a match, the vendor is identified. Once the sought-after service(s) or product(s) is found and the vendor identified, the buyer can make an Offer 40 to the vendor.

The Offer 40 is the next round in the negotiation protocol 10. In the embodiment shown in FIG. 1, the buyer makes the Offer 40. In the Offer 40 round, the buyer is offering to negotiate one or more of the attributes for service(s) or product(s) that the vendor included in the Advertisement 20 by proposing one or more values for the one or more attributes. The Offer 40 must include some or all of the attribute-value(s) that were provided by the buyer in the Look-Up 30. The Offer 40 does not have to include all of the attributes from the attribute-value pairs in the Advertisement 20. However, if the Offer 40 includes attributes not in the Advertisement 20, the vendor may not be willing to negotiate (e.g., because he does not have shoes with the non-included attributes). If the Offer 40 includes attributes that are not in the attribute-value pairs, the vendor can declare a failed negotiation due to a negotiation protocol 10 violation.

The acceptable values for each attribute may be ordered from most preferred to least preferred. For example, if the attribute-value pairs were type=pump, slipper and sandal, color=red, tan and brown, quantity=50–200, and payment method=Visa®, an acceptable Offer 40 would be: type=sandal, pump. From this Offer 40, it is known that the buyer is offering or proposing to buy a pair of sandals or pumps, and that the buyer prefers sandals.

As seen in FIG. 1, the next round is the Counter 50. The seller first makes the Counter 50 in response to the buyer's Offer 40. The negotiating party making the Counter 50 is countering or responding to the Offer 40. The Counter 50 is structured similarly to the Offer 40. However, as is discussed below, there may be one or more Counters 50 in a negotiation conducted according to the negotiation protocol 10. Furthermore, the Counter 50 must comply with more rules than the Offer 40. First, a value or values must be specified in each Counter 50 for all attributes from the previous round to which agreement has not been reached. For example, if the buyer's Offer 40 was: type=sandal, pump, the Counter 50 must list type as either sandal or pump or both sandal and pump.

Second, each Counter 50 must reduce the list of values or the numeric range for at least one attribute listed in the previous round or introduce a new attribute into the negotiation. The new attribute introduced must be one of the attributes provided in the attribute-value pairs of the Advertisement 20. For example, if the buyer's Offer 40 was: type=sandal, pump, a valid Counter 50 by the seller would be type=sandal, pump; color=tan, brown. The new attribute, color, must have been originally provided in the Advertisement 20.

Third, once agreement is reached on a value for an attribute, this agreed-to attribute is removed from the negotiation and is prohibited from being further negotiated. The agreed-to attribute may not be added back into the negotiation. Agreement is reached on a value for an attribute when a Counter 50 contains the same single value for that attribute as was contained in the previous round. For example, if the Offer 40 was: type=sandal, pump, color=red, and the Counter 50 was: type=sandal, pump, color=red, quantity=75, then agreement has been reached on the value red for the attribute color, and color is an agreed-to attribute.

As shown in FIG. 1, the negotiation protocol 10 repeats the Counter 50 round until Agreement 60 or Failure 70 is reached. In the present embodiment, the buyer and seller take turns repeating the Counter 50 in response to the previous Counter 50. Each Counter 50 must conform to the rules listed above. Either negotiating party may declare a failed negotiation if the previous Counter 50 does not conform to the rules. Therefore, the negotiation may be continued by introducing a new attribute in each Counter 50 until all the attributes of the attribute-pairs have been introduced. Likewise, the negotiation may be continued by reducing the list of values or numeric range for at least one attribute in each Counter 50. If the same, single value for an attribute is repeated in a Counter 50, agreement is reached on that value and the agreed-to attribute is removed. When an attribute is agreed-to, each negotiating party is making a commitment to the agreed-to value. The Counter 50 round is repeated until agreement is reached for values for each of the attribute-pairs provided in the Advertisement 20 or either party declares that the negotiation is failed due to a failure to agree.

One manner for shortening the negotiation is to issue an ultimatum. The ultimatum is a Counter 50 that consists of attributes having one value for each of the attributes previously introduced in the Offer 40 or previous Counter 50. The Counter 50 to an ultimatum can only either accept the values specified in the ultimatum or declare that the negotiation has failed due to a failure to agree. The ultimatum does not have to consist of all of the attributes from the attribute-value pairs. For example, if only two attributes from the attribute-value pairs have been introduced or if only two attributes from the attribute-value pairs that have been introduced remain in the negotiation (i.e., the other introduced attributes have been agreed to) an ultimatum may be issued on these two attributes alone.

The issuance of an ultimatum can be delayed by including a dummy attribute in the Advertisement 20. The dummy attribute value typically is a range of numbers. The dummy attribute is introduced into the negotiation and the numeric range of its value is reduced by at least one for each Counter 50. So long as the numeric range is more than a single number, an ultimatum cannot be issued. For example, the dummy attribute could be "retry", with the dummy attribute-value pair as retry=1–10. Subsequently, the retry value numeric range would be reduced by at least one for each Counter 50, i.e., retry=1–9, retry=1–8, retry=1–7, etcetera. Accordingly, ten (10) counters may be made after introduction of this dummy attribute retry before an ultimatum is issued. The negotiating party wishing to make an ultimatum may circumvent the dummy attribute by reducing its range to a single number (e.g., retry=1) at any point. However, by including the dummy attribute with a range greater than a single number, the negotiating parties can make their "final" offer without forcing the termination of the negotiation.

Referring back to FIG. 1, the negotiation protocol 10 asks whether agreement is reached 55 or if a failed negotiation is declared 65 after each Counter 50. As described above, agreement is only reached 55 when the negotiating parties reach agreement for all of the attributes of the attribute-value pairs. Therefore, if after any Counter 50 this requirement is met, the Agreement 60 round is reached. When the Agreement 60 round is reached, the negotiating parties have entered into a contract. In the Agreement 60 round, the negotiating parties finalize the logistics of their agreement, such as arranging the delivery of the products or services or checking the buyer's credit when agreed terms of payment specify a credit card or some other form of credit. An Agreement 60 can be voided when a buyer's credit check fails. In this situation, as above when a negotiating party declares a failed negotiation 65, the negotiation enters the Failure 70 round.

If a failed negotiation is declared 65, the negotiation enters the Failure 70 round. When the negotiation enters the Failure 70 round the negotiation terminates. Either of the negotiating parties may declare a failed negotiation 65 at any time after the Offer 40. The reasons for a failed negotiation are many. For example, they may include an improper Counter 50, e.g., a Counter 50 that fails to reduce the range of an introduced attribute or that fails to introduce a new attribute from the attribute-value pairs. Likewise, a failed negotiation may be declared 65 when a negotiating party does not agree to an ultimatum, i.e., the negotiating party responding to the ultimatum does not agree with each attribute value in the ultimatum. Whatever the reason, the Failure 70 round indicates the end of the negotiation.

Figure 2:
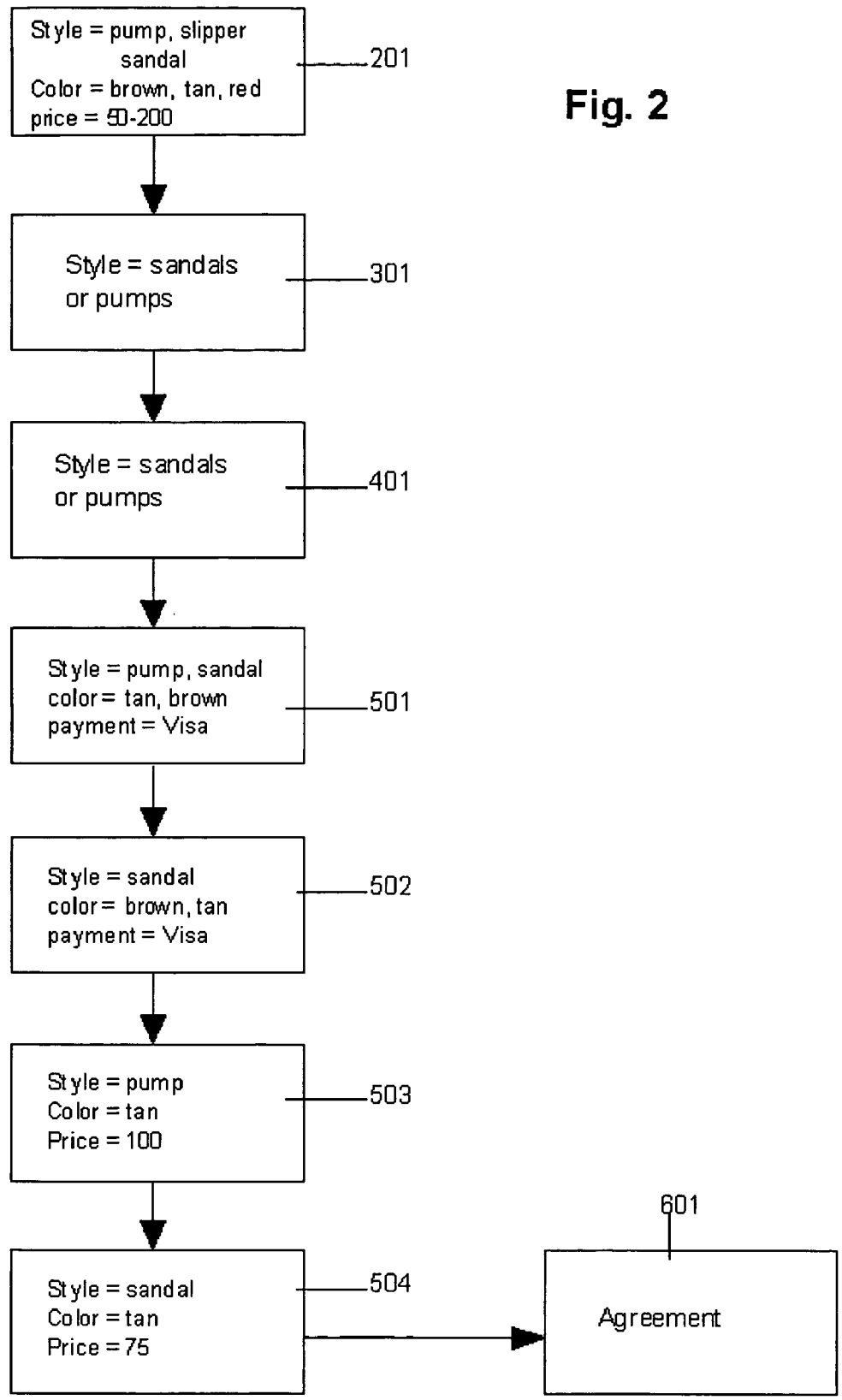
FIG. 2 is a flowchart of a negotiation conducted according to the negotiation protocol.

FIG. 2 is an illustration of a complete negotiation. Utilizing the examples given above, the negotiation described below is conducted by a shoe vendor and a buyer. The vendor advertises the following attribute-value pairs, thereby completing the advertisement 201 round: styles=pump, slipper, sandal; color=brown, tan, red; payment=Visa®; and, quantity=50–200. By listing these attribute-value pairs, the vendor has agreed to negotiate any of the attributes of style, color, quantity, and payment.

A buyer conducts the second round according to the negotiation protocol 10 by doing a look-up 301 for vendors selling sandals and pumps. By doing a look-up 301 with these style values, the buyer is guaranteeing that it is willing to negotiate the attribute style. The look-up 301 finds the shoe vendor described above since the shoe vendor had sandals and pumps among the style values it listed. If the buyer wants to negotiate with this shoe vender, it will make an offer 401.

As shown in FIG. 2, the buyer conducts the third round of the negotiation protocol 10 by making the offer 401. As stated above, the offer 401 includes some or all of the attributes included in the look-up 301. In the present example, the buyer states style=sandal, pump. This indicates that the buyer wants sandals or pumps, but that it prefers sandals (since sandal was listed first—see above). The vendor must make a Counter 50 to this offer 401.

The counter 501 to the offer 401 must include the attribute style and any other attribute(s) that the vendor wishes to include. If the vendor includes any attributes not listed in the attribute-value pairs of the advertisement 201, the rules of the negotiation protocol 10 are violated, the buyer may not wish to negotiate these attributes and the buyer may declare a failed negotiation. Here, the vendor states style=pump, sandal; color=tan, brown; and payment=Visa®. This counter 501 indicates that the vendor prefers to sell pumps rather than sandals, that it is offering to sell pumps or sandals in the colors of tan and brown to this buyer, and that it will accept payment with Visa®. The counter 501 meets the first two requirements stated above, in that it includes values for the attribute (style) listed in the previous round (the offer 401) which has not been agreed to and it introduces new attributes (color and payment) into the negotiation. There are no agreed-to attributes at this stage in the negotiation, so the third requirement stated above is not applicable.

After the counter 501, the protocol 10 asks whether agreement is reached 55 or if a failed negotiation is declared 65 (not shown). Since neither condition is met, the negotiation continues and the Counter 50 round is repeated by the buyer. The buyer's counter 502 states style=sandal; color=brown, tan; and payment=Visa®. By listing one value for style (sandal), the buyer is attempting to reach agreement for the value of its choice for the style attribute. By listing brown before tan, the buyer is indicating its preference for the color brown. By echoing the payment attribute with the single value (Visa®) that is the same value specified by the vendor in its counter 502, the buyer is indicating its agreement to this value. The attribute payment is removed from the negotiation, and therefore, may not be included in any subsequent repetitions of the Counter 50 round.

Since agreement is not reached 55 and a failed negotiation is not declared 65, the vendor next repeats the Counter 50 round. As noted above, the vendor prefers pumps, and furthermore, it does not have any brown sandals, so it cannot agree to style=sandal if color=brown, tan (if the vendor agrees to style=sandal when color=brown, tan, it is committing to provide sandals in either brown or tan). Accordingly, the vendor's counter 503 states style=pump; color=tan; and quantity=100. The counter 503 meets the requirements of including a value for all previously introduced attributes for which agreement has not been reached, of introducing a new attribute (quantity), and of not including the agreed-to attribute payment.

Again, since agreement is not reached 55 and a failed negotiation 65 is not declared, the buyer next repeats the Counter 50 round. The buyer's counter 504 states style=sandal; color=tan; and quantity=75. Again, the counter 504 meets the requirements of including a value for all previously introduced attributes for which agreement has not been reached, of reducing the numeric range of at least one attribute (quantity), and of not including the agreed-to attribute payment. More importantly, since this counter 504 has only one value for all previously introduced attributes, it is an ultimatum. The vendor can only respond to the counter 504 by accepting it or declaring a failed negotiation 65. If the vendor agrees to provide 75 tan sandals paid for by Visa®, then an Agreement 601 round is entered and a contract is entered into. In this negotiation, the vendor agrees to the counter 504, the vendor and buyer make delivery arrangements, etcetera, and the vendor checks the buyer's credit. If the vendor had not agreed, a failed negotiation is declared 65, a failure round (not shown) is entered, and the negotiation terminates.

Another embodiment of the invention allows specifying how attributes are combined. For example, the seller may have pumps in red and tan but only carries sandals in brown. The embodiment of the negotiation protocol 10 described above does not allow the seller to communicate that sandals are only available in brown without eliminating pumps from the negotiation.

The negotiation protocol 10' solves this problem by introducing disjunctions. At any stage in a negotiation, either party can introduce one or more disjunctions. In our example, the seller might introduce the disjunctions:

style=sandal; color=brown style=pump; color=red, tan in a Counter 50 round. Together the disjunctions, must follow the rules of the negotiation protocol 10 when introduced. Moreover, each of the disjunctions must separately follow the rules of the negotiation protocol 10 described above in the following negotiation rounds. Since the disjunctions when introduced together follow these rules, and since they separately follow these rules in the following negotiation rounds, termination is still guaranteed.

For example, in the Counter 50 round following the introduction of the above disjunctions, the buyer must introduce a new attribute from the Advertisement 10 or reduce the list of values for one of the attributes in each disjunction. If the buyer cannot follow these rules for either disjunction, it must either declare agreement with 55 or a failed negotiation 65 due to non-agreement for the attribute-values in that disjunction. However, as long as the buyer can follow the rules for one of the disjunctions, it may continue the negotiation. Looking at the first example disjunction, the buyer may either agree to style=sandal; color=brown, introduce a new attribute from the Advertisement 10, or declare a failed negotiation due to non-agreement for these attribute-values. In response to the second disjunction, the buyer may either reduce list of colors, introduce a new attribute from the Advertisement 10, or declare a failed negotiation 65 due to non-agreement for these attribute-values. Note that even if the buyer knows that it does not want brown sandals, it may decide to keep those attribute-values in the negotiation in order to keep the seller guessing and attempt to negotiate a better deal.

Another additional embodiment introduces two classifications of attributes: integrative and distributive. Integrative attributes have no particular benefit to one party at the expense of the other. For example, color normally is an integrative attribute. Distributive attributes, on the other hand do benefit one party at the expense of the other. Price, for example, is normally a distributive attribute. If the buyer pays too high a price, the seller benefits by the amount by which the buyer overpays. Such distributive attributes usually require a different form of negotiation.

As seen above, integrative attributes are negotiated by narrowing the choices at each step. Distributed attributes are negotiated by widening. For example, a buyer might make an Offer 40:

style=sandal; color=brown; PRICE=50 where the distributed attribute is denoted by capital letters. (This means of distinguishing attribute types is for illustrative purposes only.) The Counter 50 might then be:

style=sandal; color=brown; PRICE=100.

Agreement has now been made for brown sandals. Each subsequent round of negotiation must narrow the gap between the two proposed values for PRICE. Hence, the party specifying the smaller value for the distributive attribute must increase the value, while the party specifying the larger value must decrease the value. This rule means that either the two parties will agree on a value for each distributive attribute in a finite number of rounds, or they will agree that no agreement can be reached. Note that distributive attributes normally can not used as part of an ultimatum because they provide only a single value on each round. However, if distributive attribute is agreed to as part of the ultimatum, it may be included in the ultimatum. For example, in the Counter 50 prior to an ultimatum, the seller lowered PRICE to 75. The buyer could then issue an ultimatum with PRICE=75.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What is claimed is:

1. A method for conducting an electronic negotiation of a commercial transaction wherein said electronic negotiation is guaranteed to terminate, comprising:

a step of advertising a product with an advertisement, wherein said product that is to be negotiated is listed by a first negotiating party, the advertisement comprising a set of attribute-value pairs, each attribute-value pair including an attribute and a range of values for the attribute, for the product listed in the advertisement;

a step of looking up, wherein the product listed in the advertisement is located for a second negotiating party, wherein at least one of a first set of attribute-value pairs is displayed to the second negotiating party;

a step of offering, wherein the second negotiating party offers to negotiate one or more attributes for the product listed in the advertisement;

a step of counter-offering, wherein the first negotiating party responds to the offer with a first counter-offer; and a step of displaying at least one of a second set of attribute-value pairs to the second negotiating party it each attribute is not agreed to or a failed negotiation is not declared, wherein the second negotiating party and the first negotiating party continue to exchange counter-offers until each attribute is agreed to or the failed negotiation is declared, wherein one or more attributes from the set of attribute-value pairs are introduced with a corresponding range of values and each counter-offer reduces the range of values for at least one attribute that was previously introduced, by narrowing a gap between values for a previously introduced attribute or by introducing a new attribute from the set of attribute-value pairs.

2. The method of claim 1, wherein the step of looking up locates the product listed in the advertisement by comparing one or more attribute-values provided by the second negotiating party with the set of attribute-value pairs in the advertisement.

3. The method of claim 1, wherein the step of offering comprises a first proposed range of values that the second negotiating party is offering for a first attribute that is included in the set of attribute-value pairs.

4. The method of claim 3, wherein the first counter-offer comprises a second proposed range of values that the first negotiating party is offering for the first attribute.

5. The method of claim 4, wherein the second proposed range of values consists of the same values as the first proposed range of values and the first counter-offer further comprises a third proposed list of values or range of values that the first negotiating party is offering for a second attribute that is included in the set of attribute-value pairs.

6. The method of claim 5, wherein the first proposed range of values is a list in order from the second negotiating party's most preferred value to the second negotiating party's least preferred value.

7. The method of claim 4, wherein the first counter-offer further comprises a single proposed value that the first negotiating party is offering for a third attribute that is included in the set of attribute-value pairs.

8. The method of claim 7, further comprising a second counter-offer, in which the second negotiating party responds to the first counter-offer, the second counter-offer comprising the single proposed value from the first counter-offer, whereby the inclusion of the single proposed value indicates that the third attribute is agreed to and is prohibited from being further negotiated.

9. The method of claim 1, wherein the attribute-value pairs comprise an attribute that is negotiated with single proposed values.

10. The method of claim 1, wherein the offer and the one or more counter-offers introduce a value for each attribute in the set of attribute-value pairs, the negotiation protocol further comprising an offer that includes a single value for each attribute and in response to which the agreement is reached or the failed negotiation is declared.

11. The method of claim 1, wherein one or more attributes from the set of attribute-value palm are introduced and each counter-offer includes a value for each attribute that was previously introduced except for previously agreed to attributes.

12. The method of claim 1, wherein a single value for a first attribute from the set of attribute-value pairs is agreed to in a counter-offer and the first attribute is prohibited from being introduced into any subsequent counter-offer.

13. The method of claim 1, further comprising a step of entering into an agreement, wherein said agreement is entered into when each attribute is agreed to, whereby the first negotiating party and the second negotiating party finalize the delivery of the product.

14. The method of claim 1, wherein the first counter-offer includes a declaration of a failed negotiation due to the second negotiating party falling to comply with the negotiation protocol, whereby the failed negotiation is declared.

15. The method of claim 1, wherein one of the counter-offers introduces two or more different values for at least one attribute from the attribute-value pairs.

16. A method for electronically negotiating a commercial transaction that is guaranteed to terminate, said method comprising:

advertising a product that is offered for electronic negotiation by a first negotiation party, wherein the advertising step comprises listing a set of attribute-value pairs for the product, wherein each attribute-value pair includes an attribute and a negotiable list of values for the attribute;

looking-up the product from the advertising step, wherein the looking-up step comprises:
  displaying to a second negotiating party the set of attribute-value pairs, and
  comparing one or more attribute-values provided by the second negotiating party with the set of attribute-value pairs in the advertisement to find a match;

offering to electronically negotiate one or more attributes from the attribute-value pairs for the product, wherein the offering step comprises proposing the second negotiating party's list of values for a first attribute from the set of attribute-value pairs;

countering the offering step with the first negotiating party's proposal of a list of values for the first attribute of the product;

displaying to the second negotiating party the first negotiating party's proposal;

determining one of: when each attribute from the attribute-value pairs is agreed to, and when a failed negotiation is declared; and conducting one or more additional countering steps until one of: each attribute from the attribute-value pairs is agreed to, and the failed negotiation is declared, wherein the second negotiating party and the first negotiating party alternate conducting the countering steps until one of: each attribute from the attribute-value pairs is agreed to, and the failed negotiation is declared.

17. The method of claim 16, wherein each countering step, one of: reduces a list of values for a previously introduced attribute, narrows a gap between values for a previously introduced attribute, and introduces a new attribute from a set of attribute-value pairs unless one of: each attribute from the attribute-value pairs is agreed to, and the failed negotiation is declared.

18. The method of claim 16, wherein one of the countering steps lists a single value for each previously introduced attribute from the set of attribute-value pairs.

19. A computer program product having computer readable medium with computer program logic recorded thereon for conducting an electronic negotiation that is guaranteed to terminate, said computer program product comprising:

code for advertising a product that is to be electronically negotiated wherein said product is listed by a first negotiating party and said code for advertising operates to produce an advertisement comprising a set of attribute-value pairs, each attribute-value pair including an attribute and a range of values for the attribute, for the product listed in the advertisement;

code for looking-up said product listed in said advertisement for a second negotiating party, wherein at least one of a first set of attribute-value pair is displayed to said second negotiating party;

code for enabling said second negotiating party to submit an offer to negotiate one or more attributes for said product listed in said advertisement; and code for enabling said first negotiating party to respond to said offer with a first counter-offer and, when one of: each attribute is not agreed to, and a failed negotiation is not declared then at least one of a second set of attribute-value pairs is displayed to said second negotiating party, wherein the second negotiating party and the first negotiating party continue to exchange counter-offers until one of: each attribute is agreed to, and the failed negotiation is declared.

20. The computer program product of claim 19 wherein said code for looking-up said product locates the product listed in the advertisement by comparing one or more attribute-values provided by the second negotiating party with the set of attribute-value pairs in the advertisement.

21. The computer program product of claim 19 wherein said offer comprises a first proposed range of values that the second negotiating party is offering for a first attribute that is included in the set of attribute value pairs.

22. The computer program product of claim 21, wherein the first counter-offer comprises a second proposed range of values that the first negotiating party is offering for the first attribute.

23. The computer program product of claim 22, wherein the second proposed range of values consists of the same values as the first proposed range of values and the first counter-offer further comprises a third proposed range of values that the first negotiating party is offering for a second attribute that is included in the set of attribute-value pairs.

24. The computer program product of claim 23, wherein the first proposed range of values is a list in order from the second negotiating party's most preferred value to the second negotiating parts least preferred value.

25. The computer program product of claim 22, wherein the first counter-offer further comprises a single proposed value that the first negotiating party is offering for a third attribute that is included in the set of attribute-value pairs.

26. The computer program product of claim 25, further comprising code for enabling said second negotiating party to respond to said first counter-offer with a second counter-offer, wherein the second counter-offer comprises the single proposed value from the first counter-offer, whereby the inclusion of the single proposed value indicates that the third attribute is agreed to and is prohibited from being further negotiated.

27. The computer program product of claim 19, wherein the attribute-value pairs comprise an attribute that is negotiated with single proposed values.

28. The computer program product of claim 19, wherein the offer and the one or more, counter-offers introduce a value for each attribute in the set of attribute-value pairs, the computer program product further comprising code for creating a final offer that includes a single value for each attribute and in response to said final offer one of: the agreement is reached, and the failed negotiation is declared.

29. The computer program product of claim 19, wherein one or more attributes from the set of attribute-value pairs are introduced and each counter-offer includes a value for each attribute that was previously introduced except for previously agreed to attributes.

30. The computer program product of claim 19, wherein one or more attributes from the set of attribute-value pairs are introduced with a corresponding range of values and each counter-offer reduces the range of values for at least one attribute that was previously introduced, and one of; narrows a gap between values for a previously introduced attribute, and introduces a new attribute from the set of attribute-value pairs.

31. The computer program product of claim 19, wherein a single value for a first attribute from the set of attribute-value pairs is agreed to in a counter-offer and the first attribute is prohibited from being introduced into any subsequent counter-offer.

32. The computer program product of claim 19, further comprising code for creating an agreement, that is entered into when each attribute is agreed to, whereby said code for creating an agreement assist the first negotiating party and the second negotiating party in finalizing the delivery of the product.

33. The computer program product of claim 19, wherein the first counter offer includes a declaration of a failed negotiation due to the second negotiating party failing to comply with rules of the negotiation, whereby the failed negotiation is declared.

34. The computer program product of claim 19, wherein one of the counter-offers introduces two or more different values for at least one attribute from the attribute-value pairs.

* * * * *